United States Patent
Ottolini et al.

(10) Patent No.: US 11,135,904 B2
(45) Date of Patent: Oct. 5, 2021

(54) DOOR PRESENTER WITH HOLD OPEN AND POWER CINCHING FUNCTION

(71) Applicant: Inteva Products, LLC, Troy, MI (US)

(72) Inventors: Philippe Ottolini, La Voivre (FR); Mathias Barth, Azerailles (FR)

(73) Assignee: INTEVA PRODUCTS, LLC, Troy, MI (US)

( * ) Notice: Subject to any disclaimer, the term of this patent is extended or adjusted under 35 U.S.C. 154(b) by 910 days.

(21) Appl. No.: 15/848,126

(22) Filed: Dec. 20, 2017

(65) Prior Publication Data

US 2019/0184795 A1 Jun. 20, 2019

(51) Int. Cl.

| | |
|---|---|
| *E05F 15/00* | (2015.01) |
| *B60J 5/04* | (2006.01) |
| *E05B 81/50* | (2014.01) |
| *E05B 81/38* | (2014.01) |
| *E05B 85/04* | (2014.01) |
| *E05B 85/00* | (2014.01) |
| *E05C 17/00* | (2006.01) |
| *E05B 81/20* | (2014.01) |
| *E05B 47/00* | (2006.01) |

(52) U.S. Cl.
CPC ............... *B60J 5/047* (2013.01); *E05B 81/20* (2013.01); *E05B 81/38* (2013.01); *E05B 81/50* (2013.01); *E05B 85/01* (2013.01); *E05B 85/04* (2013.01); *E05C 17/003* (2013.01); *E05B 47/0046* (2013.01); *E05Y 2400/32* (2013.01)

(58) Field of Classification Search
CPC ........ E05C 17/003; E05C 17/00; E05B 81/50; E05B 85/01; E05B 47/0046; E05B 77/245; E05B 81/20; E05B 85/04; E05B 85/26; E05B 81/38; E05B 81/01; E05B 81/06
USPC .................................. 49/139, 140, 364, 277
See application file for complete search history.

(56) References Cited

U.S. PATENT DOCUMENTS

| | | | |
|---|---|---|---|
| 6,955,389 B2 | 10/2005 | Suzuki et al. | |
| 7,059,629 B2 | 6/2006 | Takahara | |
| 7,210,713 B2 | 5/2007 | Yoshida et al. | |
| 2010/0244466 A1* | 9/2010 | Tomaszewski | E05B 85/01 292/201 |
| 2012/0175896 A1* | 7/2012 | Martinez | E05B 81/06 292/199 |
| 2014/0088826 A1 | 3/2014 | Wheeler et al. | |

(Continued)

FOREIGN PATENT DOCUMENTS

| | | |
|---|---|---|
| CN | 208040095 U | 11/2018 |
| CN | 109944512 A | 6/2019 |

(Continued)

*Primary Examiner* — Chi Q Nguyen
(74) *Attorney, Agent, or Firm* — Cantor Colburn LLP

(57) ABSTRACT

A vehicle door presenting system includes an actuator striker positioned at one of a vehicle body surface or a vehicle door, and an actuator positioned at the other of the vehicle body surface or the vehicle door and engagable with the actuator striker. The actuator is configured to move the vehicle door between a fully closed position and a partially open position via interaction between the actuator and the actuator striker. The actuator includes a retaining portion to maintain engagement with the actuator striker. The retaining portion retains the vehicle door in the partially open position to prevent the vehicle door from moving toward a fully open position.

18 Claims, 16 Drawing Sheets

(56) References Cited

U.S. PATENT DOCUMENTS

| | | | | |
|---|---|---|---|---|
| 2016/0017645 A1* | 1/2016 | Tomaszewski | ......... | E05B 81/06 |
| | | | | 292/240 |
| 2016/0245000 A1* | 8/2016 | Ottino | ..................... | E05B 85/26 |
| 2016/0312499 A1* | 10/2016 | Fannon | ................... | E05B 81/20 |
| 2016/0362916 A1* | 12/2016 | Tomaszewski | ......... | E05B 81/90 |
| 2017/0051540 A1* | 2/2017 | Okeke | ..................... | E05B 85/26 |
| 2017/0314298 A1* | 11/2017 | Tomaszewski | ......... | E05B 81/06 |
| 2018/0051502 A1* | 2/2018 | Roos | ....................... | E05B 81/34 |
| 2018/0087298 A1* | 3/2018 | Strole | ..................... | E05B 81/16 |
| 2019/0017301 A1* | 1/2019 | Gumbo | .................. | E05B 81/72 |
| 2019/0249467 A1* | 8/2019 | Patane | ................... | E05B 81/14 |
| 2019/0271180 A1* | 9/2019 | Sardelli | ................. | E05B 77/02 |

FOREIGN PATENT DOCUMENTS

| | | | |
|---|---|---|---|
| DE | 19809415 | A1 | 9/1999 |
| DE | 202017105041 | U1 | 9/2017 |
| DE | 202016104563 | U1 | 11/2017 |
| EP | 1614840 | A3 | 1/2006 |
| WO | 2004065734 | A1 | 8/2004 |

* cited by examiner

DOOR PRESENTER WITH HOLD OPEN AND POWER CINCHING FUNCTION

BACKGROUND

The subject matter disclosed herein relates to vehicle doors and, more particularly, to a vehicle door opening mechanism.

Traditional vehicle doors include a handle that a user may physically interact with to grasp and open a vehicle door. Recently, some vehicle doors do not include an exterior handle and door opening is facilitated via electromagnetic actuation that is prompted with a user fob or the like. The actuation system may open the door slightly to allow a user to grasp the vehicle door to manually complete the door opening process. In some situations, the door may open suddenly and with substantial force. For example, a high wind condition or a steeply parked car may lead to sudden opening. Rapid and unexpected opening of the vehicle door may potentially and undesirably strike the user or a surrounding object.

BRIEF DESCRIPTION

In one embodiment, a vehicle door presenting system includes an actuator striker positioned at one of a vehicle body surface or a vehicle door, and an actuator positioned at the other of the vehicle body surface or the vehicle door and engagable with the actuator striker. The actuator is configured to move the vehicle door between a fully closed position and a partially open position via interaction between the actuator and the actuator striker. The actuator includes a retaining portion to maintain engagement with the actuator striker. The retaining portion retains the vehicle door in the partially open position to prevent the vehicle door from moving toward a fully open position.

Additionally or alternatively, in this or other embodiments the actuator includes an actuator drive, and a cam operably connected to the actuator drive; the cam having a cam channel receptive of the actuator striker at a cam channel entrance.

Additionally or alternatively, in this or other embodiments the cam channel includes a curvilinear portion having an inner channel wall and an outer channel wall defining a width of the cam channel, configured to urge the vehicle door from a fully closed position to the partially open position with rotation of the cam about a cam axis in a first direction.

Additionally or alternatively, in this or other embodiments interaction of the actuator striker with the inner channel wall urges the vehicle door from the fully closed position to the partially open position with rotation of the cam about the cam axis.

Additionally or alternatively, in this or other embodiments the curvilinear portion is configured to urge the vehicle door from the latch secondary engaged position to the fully closed position with rotation of the cam about the cam axis in a second direction.

Additionally or alternatively, in this or other embodiments interaction of the outer channel wall with the actuator striker urges the vehicle door from the latch secondary engaged position toward the fully closed position.

Additionally or alternatively, in this or other embodiments the retaining portion is located at an end of the curvilinear portion.

Additionally or alternatively, in this or other embodiments a secondary sensor is included such that, when activated, the actuator striker is released from the partially open position, allowing for movement of the door from the partially open position toward the fully open position.

Additionally or alternatively, in this or other embodiments the secondary sensor can be utilized as an anti-pinch sensor when actuator is turning in the opposite way to close the vehicle door from a latch secondary engaged position to the fully closed position.

Additionally or alternatively, in this or other embodiments the actuator is integral with a door latch.

Additionally or alternatively, in this or other embodiments actuator striker is retractable.

In another embodiment, a vehicle door assembly includes a vehicle door, an electronic latch assembly operatively coupled to the vehicle door, and a vehicle door presenting system positioned at the vehicle door. The vehicle door presenting system includes an actuator striker located at one of a vehicle body surface or a vehicle door, and an actuator located at the other of the vehicle body surface or the vehicle door and engagable with the actuator striker. The actuator is configured to move the vehicle door between a fully closed position and a partially open position via interaction between the actuator and the actuator striker. The actuator includes a retaining portion to maintain engagement with the actuator striker. The retaining portion retains the vehicle door in the partially open position to prevent the vehicle door from moving toward a fully open position.

Additionally or alternatively, in this or other embodiments the actuator includes an actuator drive and a cam operably connected to the actuator drive; the cam having a cam channel receptive of the actuator striker at a cam channel entrance.

Additionally or alternatively, in this or other embodiments the cam channel includes a curvilinear portion having an inner channel wall and an outer channel wall defining a width of the cam channel, configured to urge the vehicle door from a fully closed position to the partially open position with rotation of the cam about a cam axis in a first direction.

Additionally or alternatively, in this or other embodiments interaction of the actuator striker with the inner channel wall urges the vehicle door from the fully closed position to the partially open position with rotation of the cam about the cam axis.

Additionally or alternatively, in this or other embodiments the curvilinear portion is configured to urge the vehicle door from the partially open position to the fully closed position with rotation of the cam about the cam axis in a second direction.

Additionally or alternatively, in this or other embodiments interaction of the outer channel wall with the actuator striker urges the vehicle door from the partially open position toward the fully closed position.

Additionally or alternatively, in this or other embodiments the retaining portion is positioned at an end of the curvilinear portion.

Additionally or alternatively, in this or other embodiments a secondary sensor is included such that, when activated, the actuator striker is released from the partially open position, allowing for movement of the vehicle door from the partially open position toward the fully open position.

Additionally or alternatively, in this or other embodiments the actuator is integral with the electronic latch assembly.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
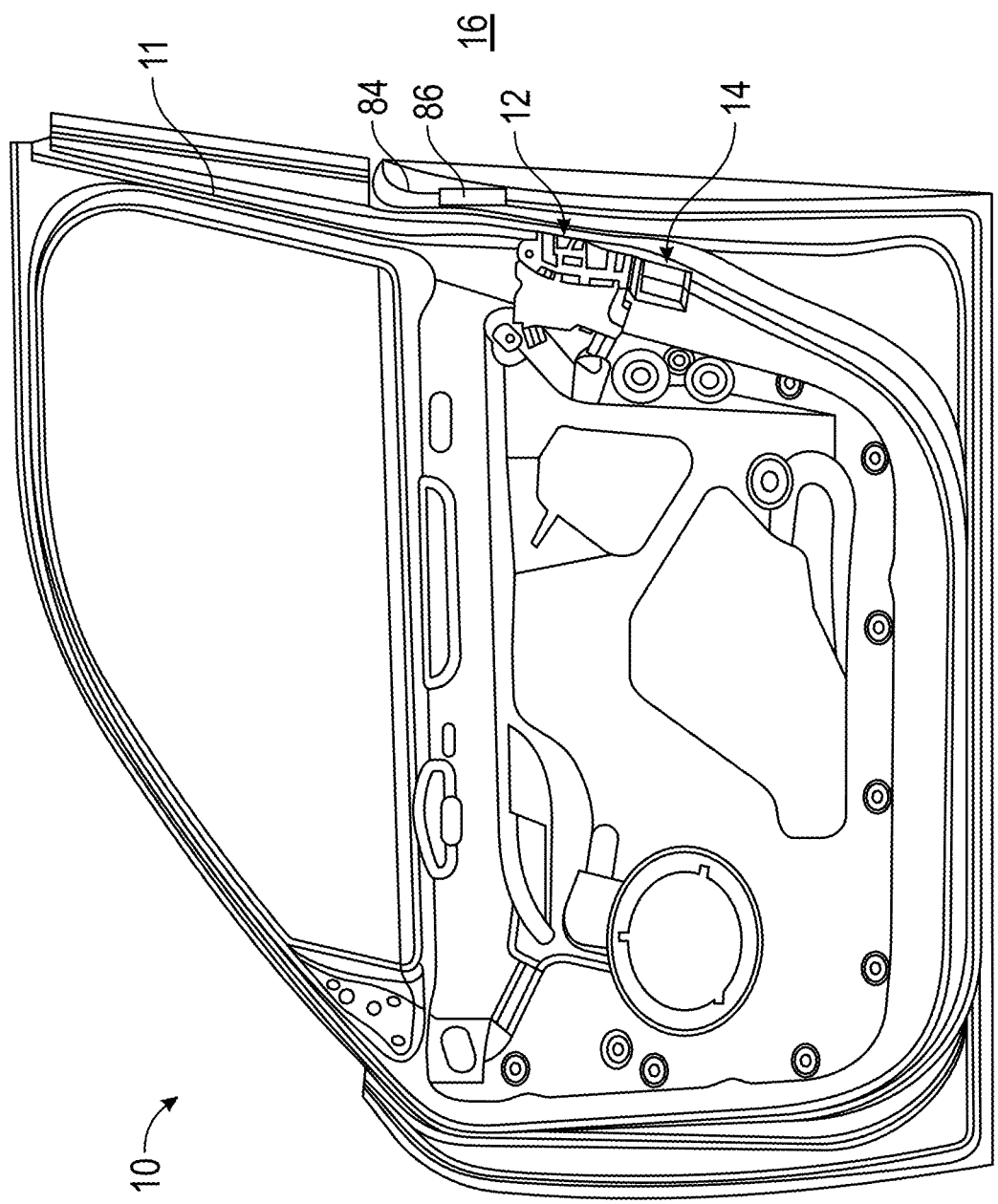
FIG. 1 is an illustration of an embodiment of a vehicle door assembly.

Referring now to FIG. 1, the reference numeral 10 generally designates a vehicle door assembly. The vehicle door assembly 10 may be installed as a driver side door, passenger side door, or rear passenger doors. Additionally, although referred to herein as a vehicle door 11 that is included in the assembly 10, the vehicle door assembly 10 may be installed as a rear door assembly of the vehicle, such as a liftgate, trunk or tailgate, for example. A vehicle latch assembly 12 is operatively coupled to the vehicle door 11 to hold the door (or liftgate, trunk, tailgate, etc.) in a closed position and to release the vehicle door to allow a user to move the vehicle door 11 to an open position. The vehicle latch assembly 12 is an electromechanical latch assembly in some embodiments, thereby providing opening assistance to a user.

In the embodiments described herein, the vehicle door 11 does not include a door handle on the exterior of the vehicle door 11. By not including a door handle, the door may be more aesthetically pleasing and/or provides an additional security measure that inhibits unauthorized access to the vehicle. A keyless entry mechanism or device is employed to initiate a door opening procedure. For example, a fob, mobile device application, keypad, or a similar keyless entry mechanism, may be utilized to actuate door opening. In particular, the vehicle latch assembly 12 is actuated to permit door opening.

Working in conjunction with the vehicle latch assembly 12 is a door presenter 14 that is operatively coupled to the vehicle door 11. In the illustrated embodiment, the door presenter 14 is disposed beneath the vehicle latch assembly 12, but it is to be appreciated that the door presenter 14 may be located adjacent the vehicle latch assembly 12 in an alternative adjacent configuration or spaced therefrom. In still other embodiments, the vehicle latch assembly 12 and the door presenter 14 may be disposed in a common housing.

As used herein, a closed position of the vehicle door 11 refers to a completely closed position of the vehicle door 11, such that the door is not ajar from the vehicle body. A partially open position of the vehicle door 11 refers to an ajar position of the door, relative to the vehicle body, the door spaced from the vehicle body to an extent sufficient to allow a user to insert fingers between the inner panel of the vehicle door 11 and the vehicle body in a manner that permits movement of the vehicle door 11 away from the partially open position to a fully open position of the vehicle door. The fully open position refers to a position that allows a user to enter the vehicle. In some embodiments, the partially open position is defined by a space between the vehicle door 11 and the vehicle body surface 16 of less than about 50 millimeters. In some embodiments, the partially open position is defined by a space between the vehicle door 11 and the vehicle body surface 16 of between about 10 millimeters and about 40 millimeters.

Figure 2:
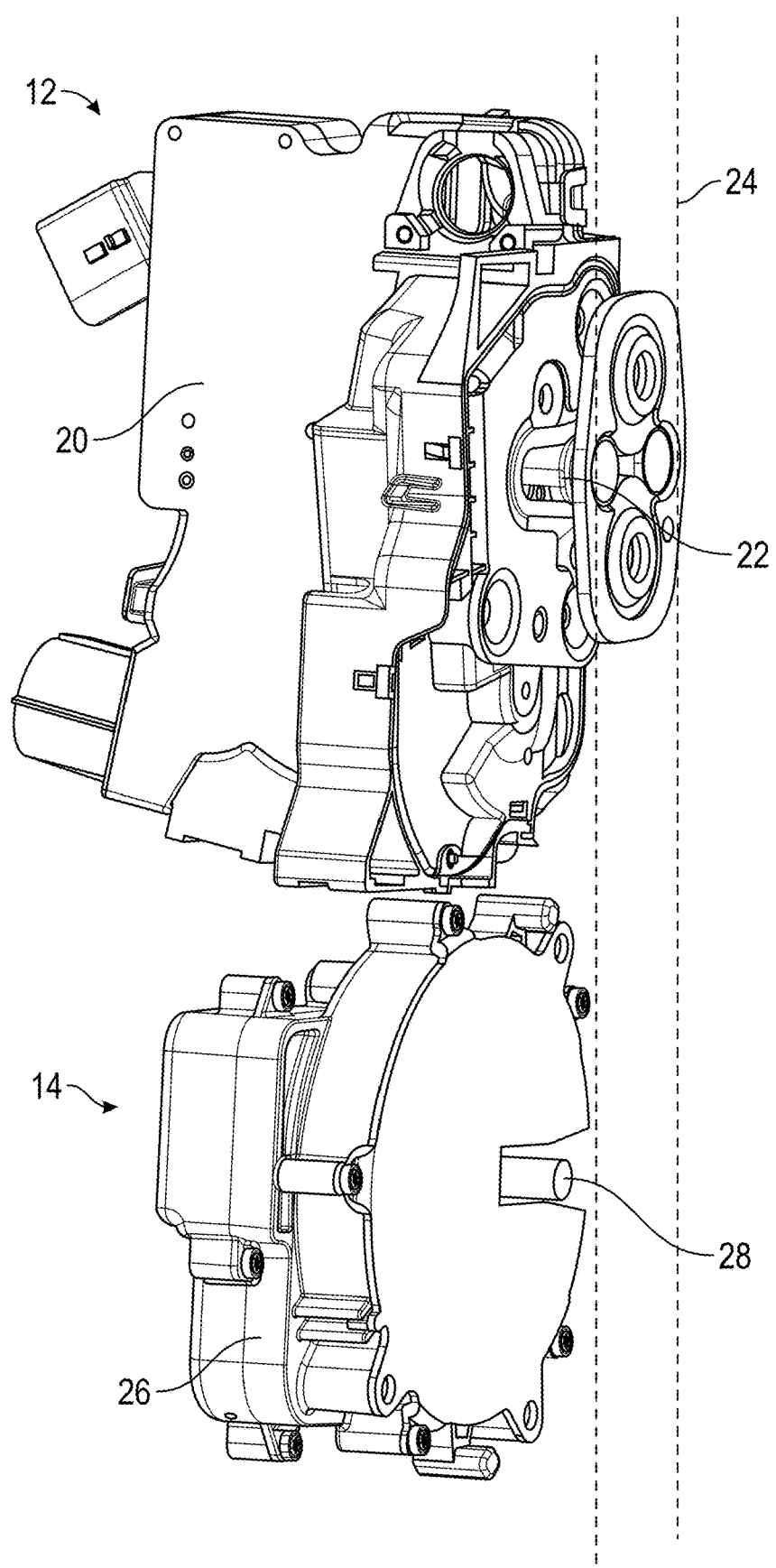
FIG. 2 is an illustration of an embodiment of a latch and presenter system for a vehicle door assembly.

Referring to FIG. 2, the vehicle latch assembly 12 includes a latch 20 disposed at the vehicle door 11, and a latch striker 22 disposed at a fixed vehicle structure 24, such as a B-pillar or C-pillar of the vehicle. The latch 20 interfaces with the latch striker 22 to retain the vehicle door 11 in the completely closed position. Similarly, the door presenter 14 includes an actuator 26 disposed at the vehicle door 11 and an actuator striker 28 disposed at the fixed vehicle structure 24. Further, in some embodiments the actuator striker 28 may be disposed at the vehicle door 11 and the door presenter 14 is disposed at the fixed vehicle structure 24.

Figure 3:
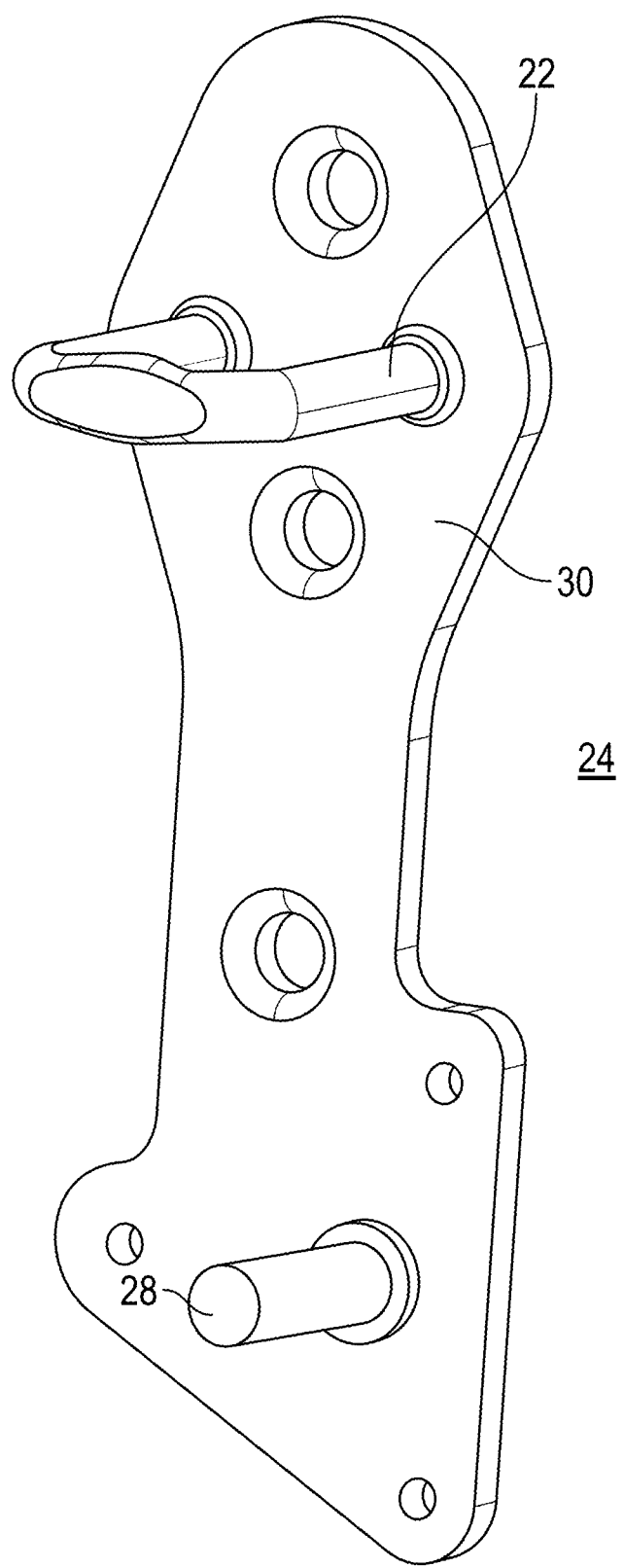
FIG. 3 is an illustration of an embodiment of a striker assembly.

In some embodiments, such as shown in FIG. 3, the actuator striker 28 and the latch striker 22 are connected to a common striker plate 30, to improve assembly fits and tolerances, and to further reduce cost. In other embodiments, however, the latch striker 22 and the actuator striker 28 may be connected to independent striker plates 30. Further, in some embodiments, the actuator striker 28 may be retractable, to move into and out of the fixed vehicle structure 24, either manually or electromechanically via a motor or the like.

Figure 4:
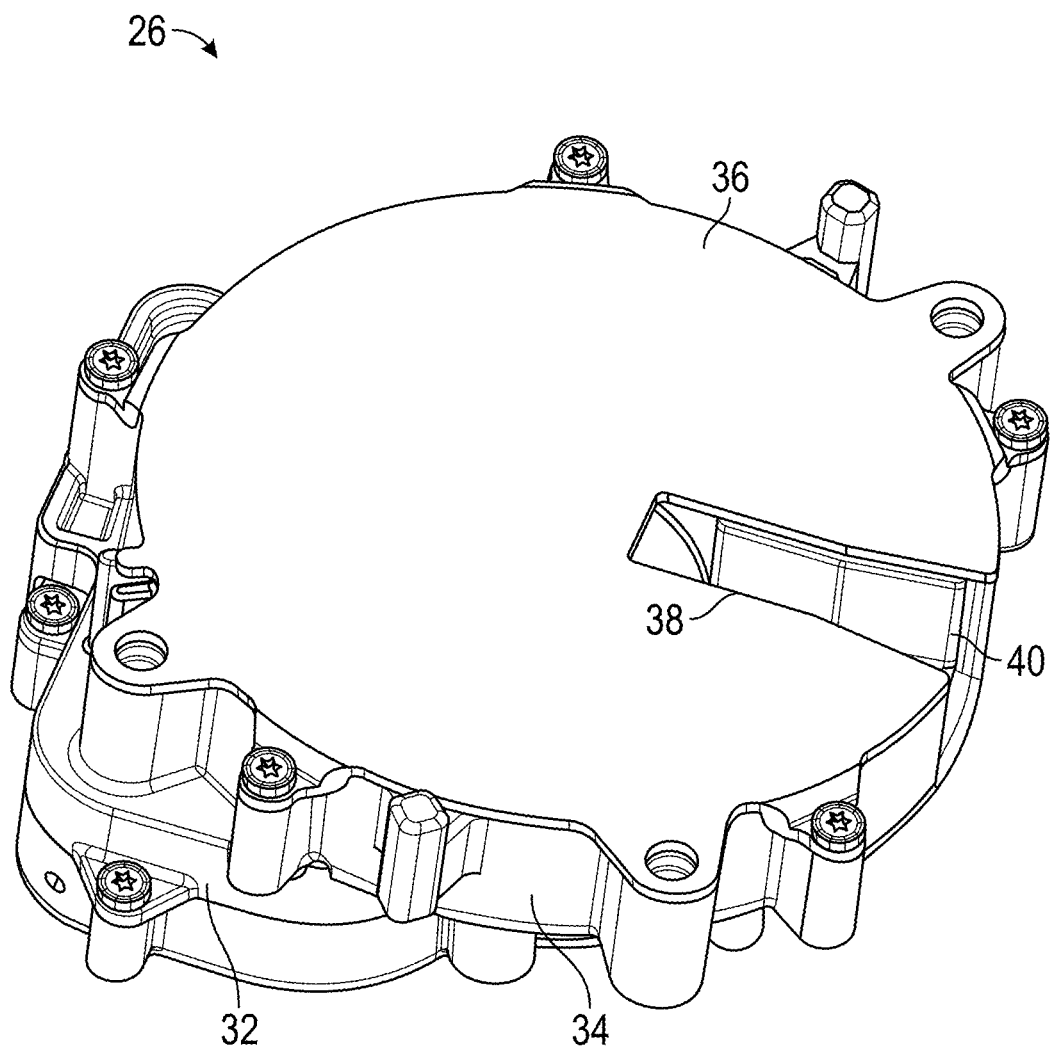
FIG. 4 is a perspective view of an embodiment of an actuator for a door presenter.
Figure 5:
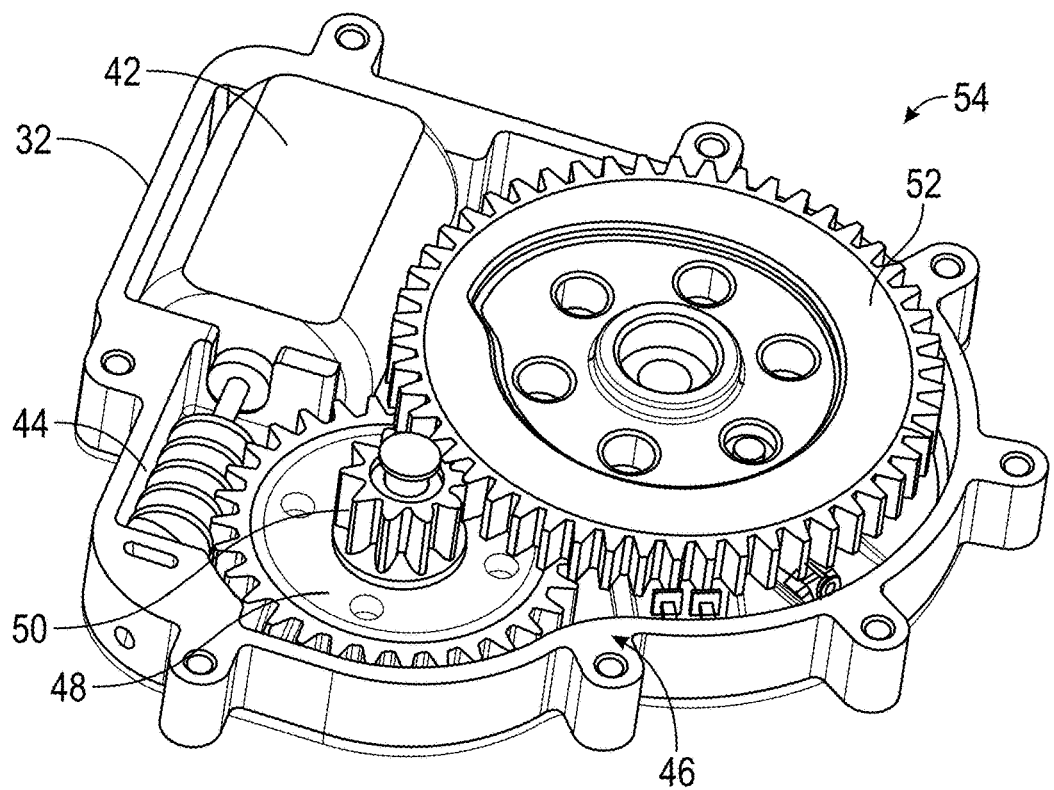
FIG. 5 is a partial view of an embodiment of an actuator for a door presenter.
Figure 6:
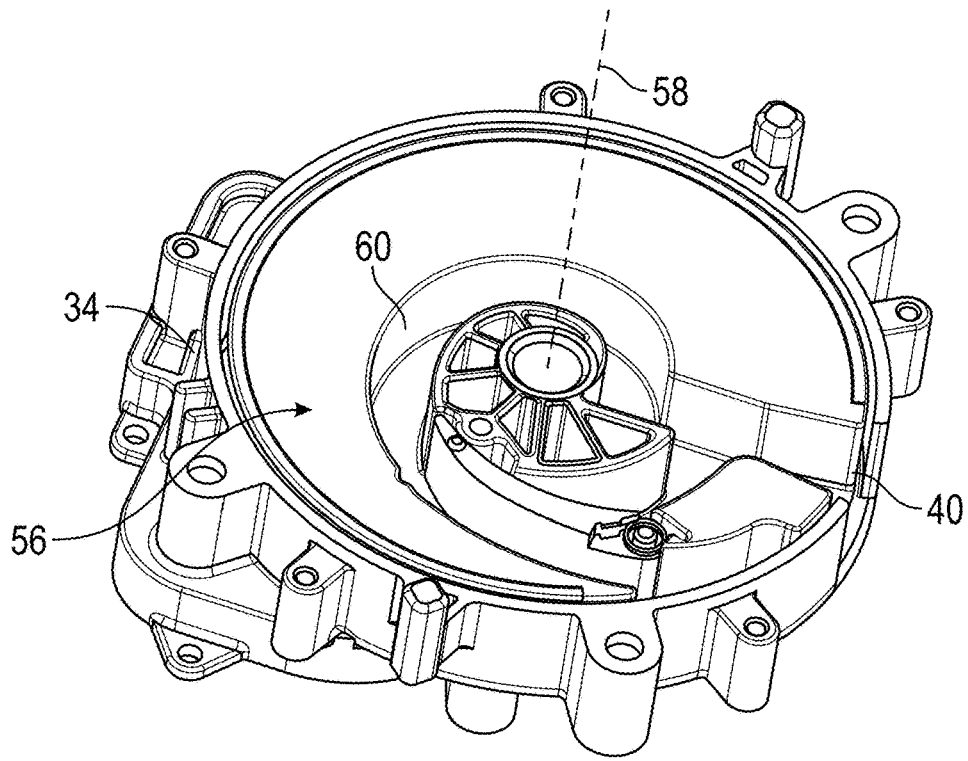
FIG. 6 is another partial view of an embodiment of an actuator for a door presenter.

Referring now to FIG. 4, an embodiment of the actuator 26 is illustrated. The actuator 26 includes an actuator housing 32, an actuator cover 34 and an actuator top cover 36 secured to each other to form the actuator 26. The actuator top cover 36 and the actuator cover 34 include a top cover opening 38 and a cover opening 40, respectively, to receive the actuator striker 28. Referring now to FIGS. 5 and 6, partial views of the actuator 26 are illustrated. FIG. 5, in particular, illustrates the actuator housing 32 and contents thereof, comprising a drive system 54 for the actuator 26. A motor 42 is disposed in the actuator housing 32 to drive operation of the actuator 26. In particular, the motor 42 drives rotation of a worm screw 44, which is meshed with and drives a gear train 46. In the embodiment illustrated, the gear train includes a first gear 48 meshed with the worm screw 44 and is co-rotational with a first pinion 50. The first pinion 50 drives rotation of a second gear 52. It is to be appreciated that the drive system 54 illustrated in FIG. 5 and described herein is merely exemplary, and other drive system 54 configurations are contemplated within the present scope.

Referring now to FIG. 6, the actuator 26 is illustrated with the actuator top cover 36 removed. A cam 56 is position in the actuator cover 34 and is connected to the second gear 52 such that rotation of the second gear 52 drives rotation of the cam 56 about a cam axis 58. The cam 56 includes a cam channel 60 which interacts with the actuator striker 28 with rotation of the cam 56 about the cam axis 58 to move the door 11 from a fully closed position to a partially open position, and from the partially open position to the fully closed position, as will be described in further detail below.

Figure 7:
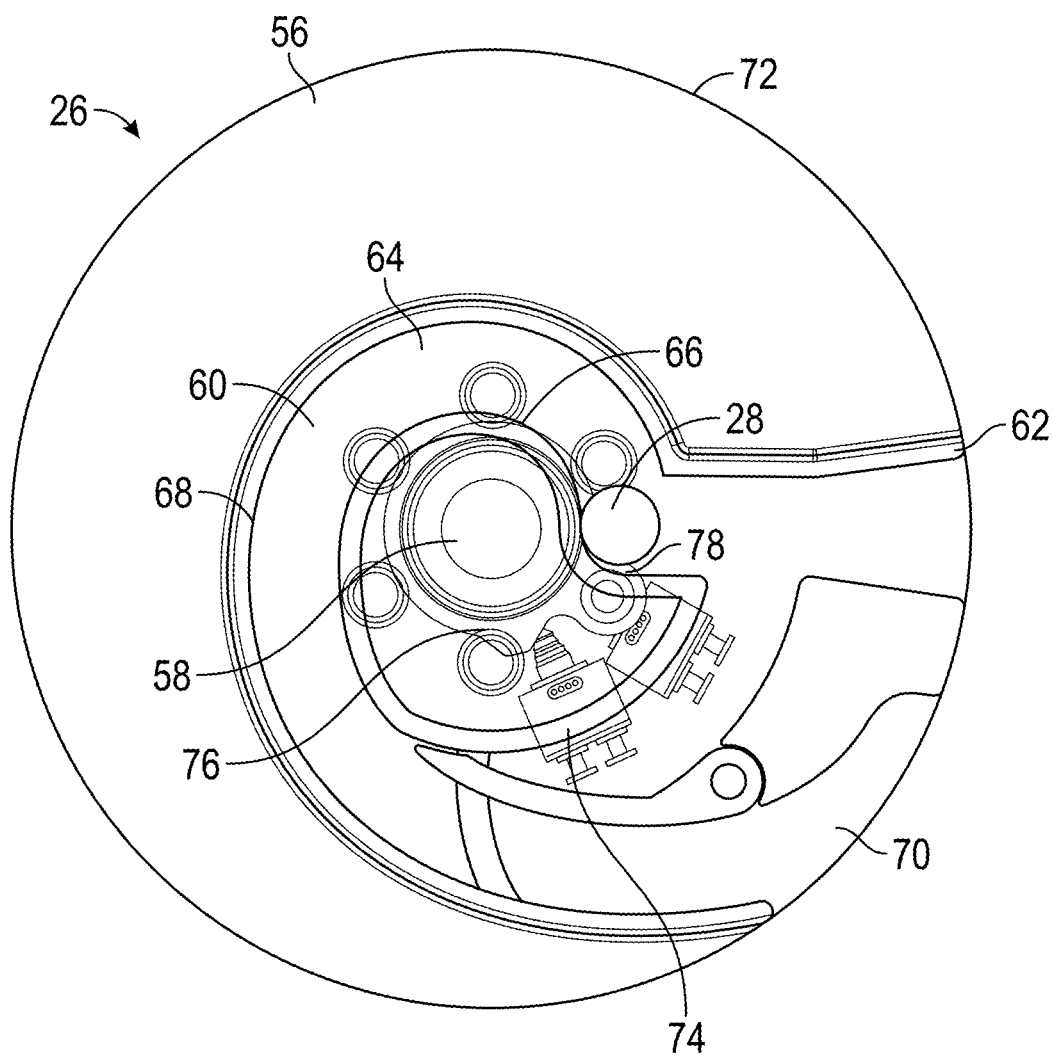
FIG. 7 is a plan view of an embodiment of a cam for an actuator of a door presenter.

Referring now to FIG. 7, a plan view of the actuator 26 is illustrated, with the actuator top cover 36 removed for clarity. The cam channel 60 includes a channel entrance 62 at an outer periphery 72 of the cam 56, which is aligned with the top cover opening 38 and the cover opening 40. From the channel entrance 62, the cam channel 60 extends radially inwardly toward the cam axis 58, then proceeds along a curvilinear portion 64, which includes a channel inner wall 66 and a channel outer wall 68, in which the channel inner wall 66 is nearer to the cam axis 58 than the channel outer wall 68. The curvilinear portion 64 extends to a channel exit 70 at the outer periphery 72 of the cam 56. The cam channel 60 is formed and configured such that the actuator striker 28 fits between the channel inner wall 66 and the channel outer wall 68. Further, a reset switch 74 interfaces with a switch cam 76, which is coaxial with and rotates with the cam 56. In FIG. 7, the cam 56 and the actuator striker 28 are shown as the vehicle door 11 is in the fully closed position, with the actuator striker 28 located at a reset position 78, which in some embodiments is an intersection of the curvilinear portion 64 with the channel entrance 62.

Figure 8A:
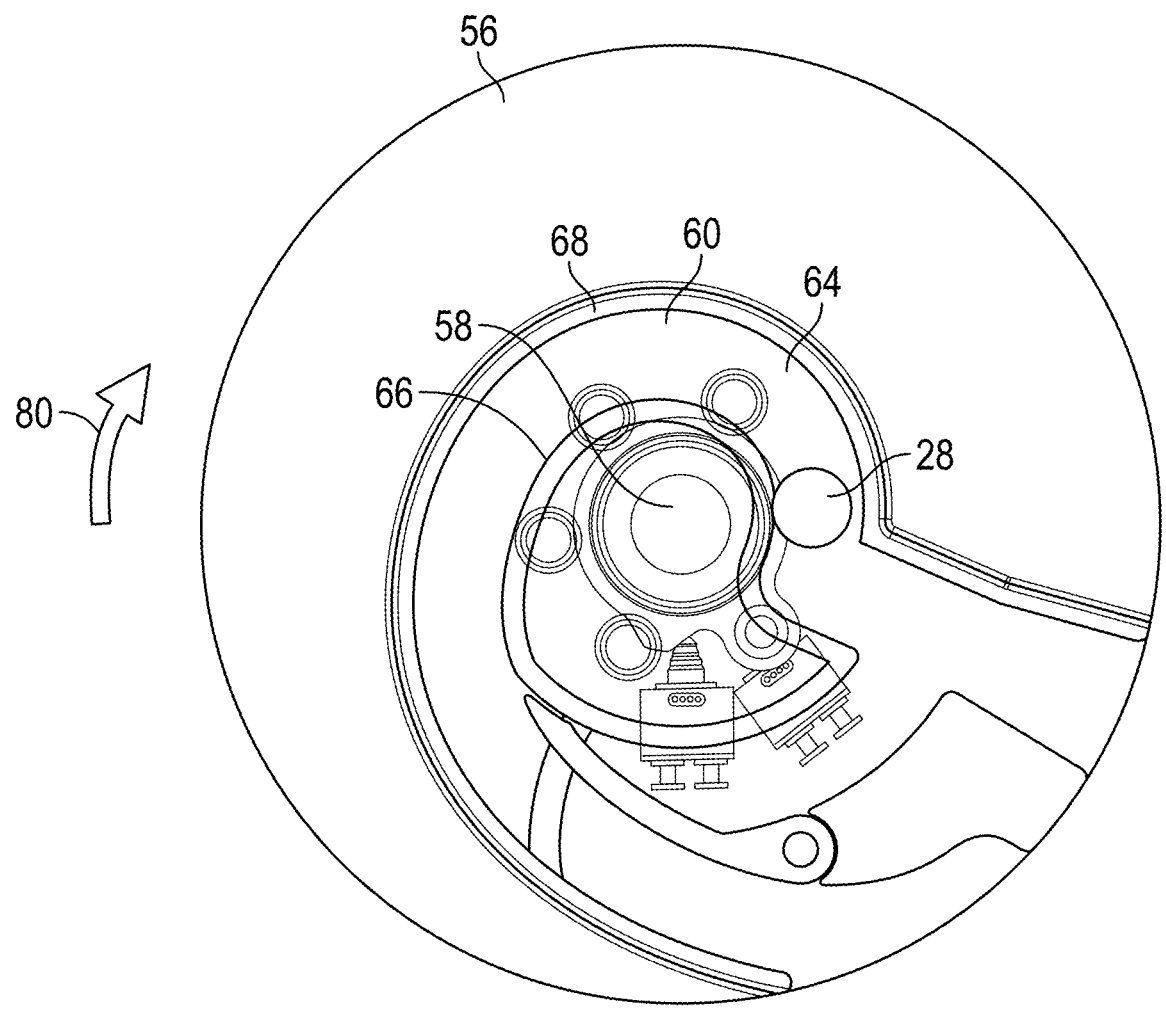
FIGS. 8a-8d illustrate a door opening operation of an embodiment of a door presenter.
Figure 8B:
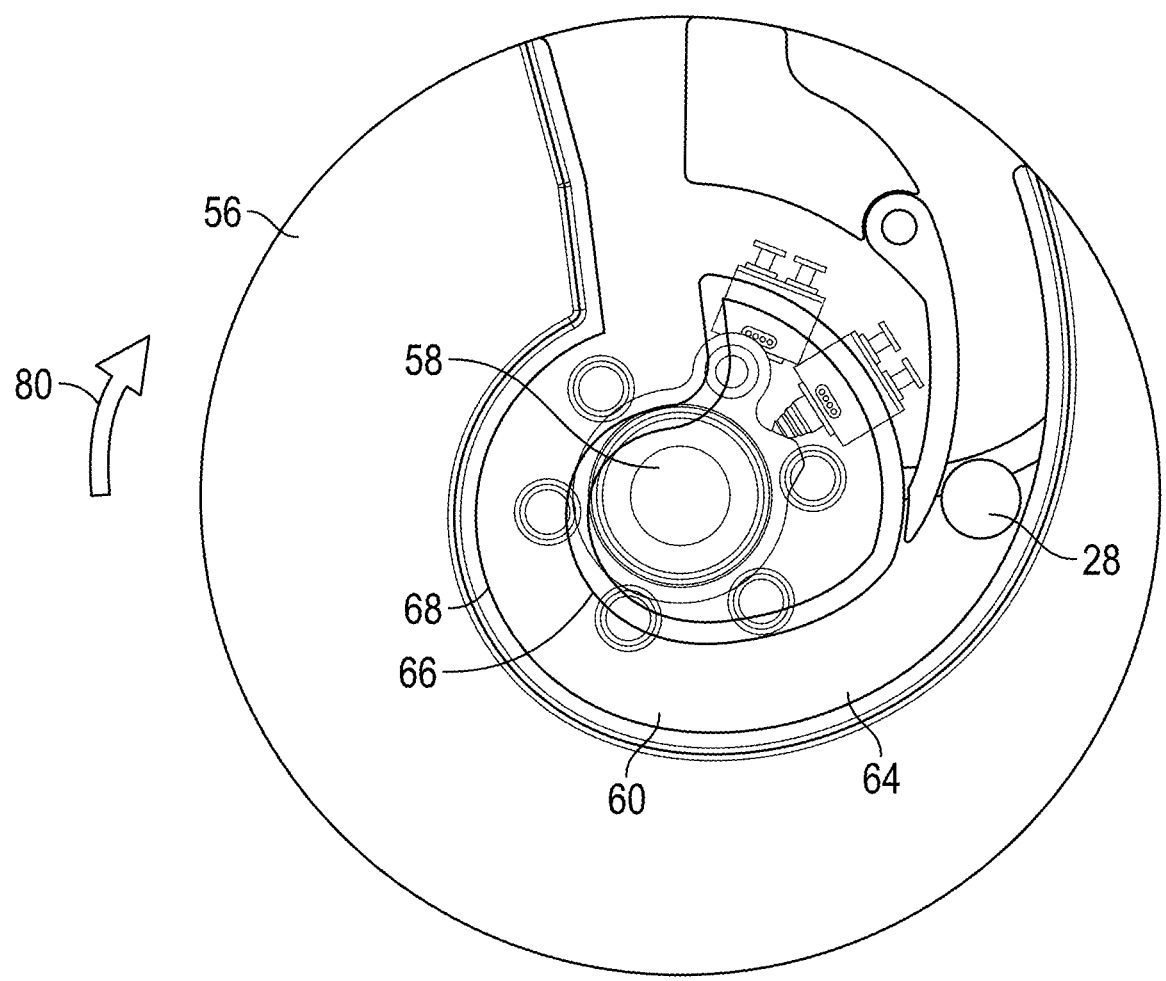
Figure 8C:
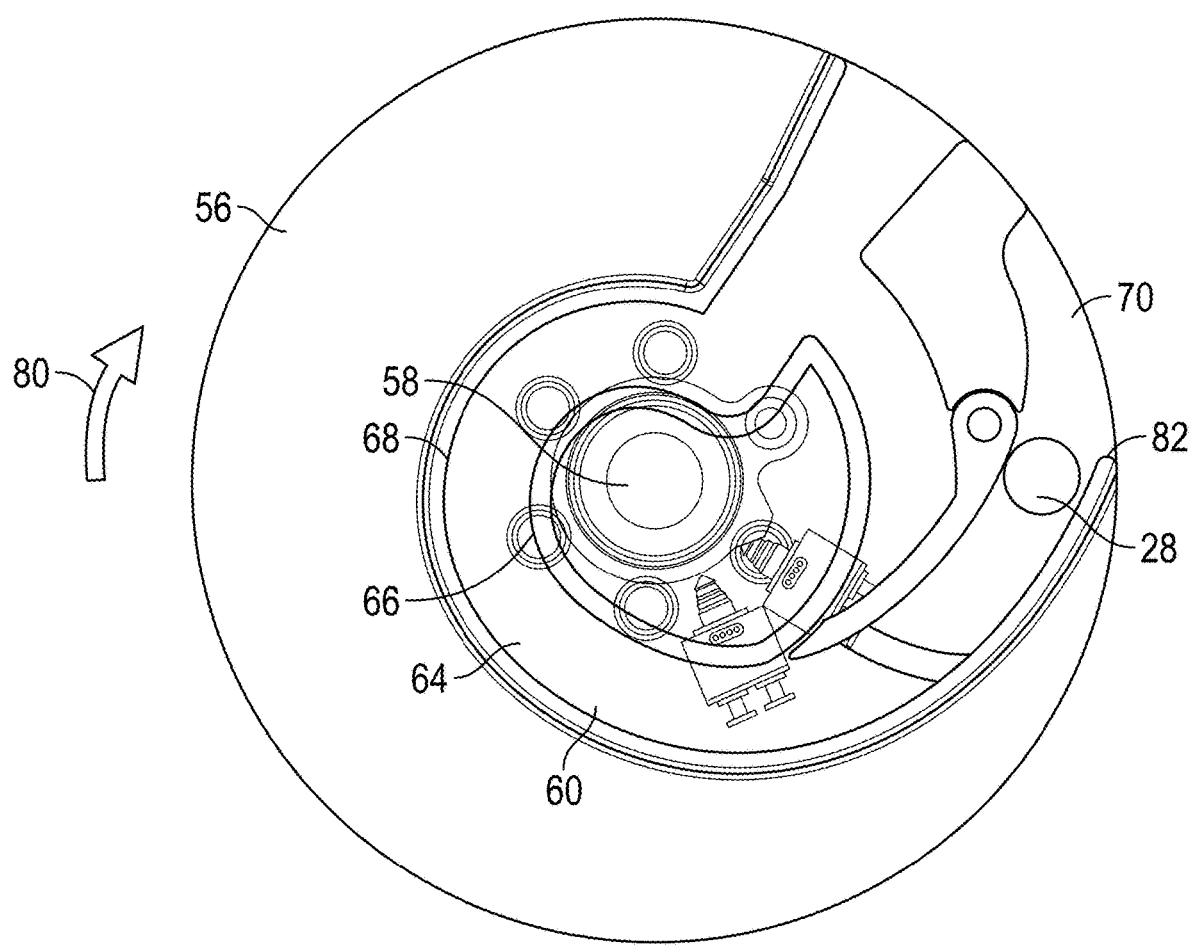

Referring now to FIGS. 8a-8d, the door opening or presentation sequence will be described. In FIG. 8a, once a door presentation signal is received, the cam 56 is rotated in the clockwise direction 80 about the cam axis 58 by the drive system 54. As the cam 56 rotates, the actuator striker 28 proceeds into the curvilinear portion 64 and rests against the channel inner wall 66. As the cam 56 continues to rotate in the clockwise direction 80, as in FIG. 8b, the vehicle door 11 including the actuator 26 is urged toward the partially opened position, which is to the left in the drawing. In FIG. 8c, the striker pin 28 reaches a parked position 82, adjacent to the channel exit 70. In the parked position 82, the actuator striker 28 is still engaged in the cam channel 60, preventing the vehicle door 11 from moving from the partially open position to the fully open position by, for example, wind or due to the vehicle being parked on a slope.

Figure 8D:
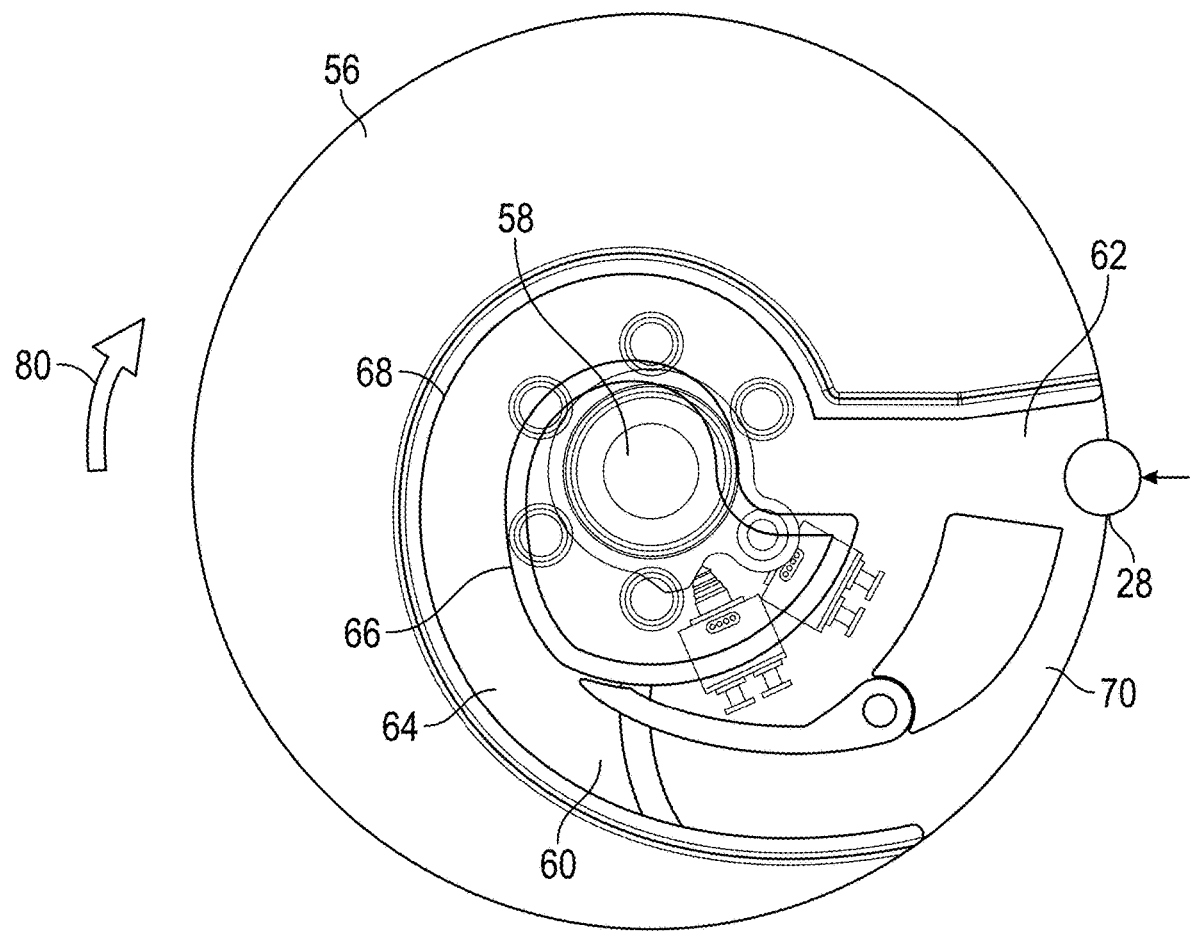

When the vehicle door 11 is in the partially open position, a user may grab or touch a door flange 84 (shown in FIG. 1), and operate a secondary sensor or switch 86, at which time the cam 56 will be urged into a door release position, as shown in FIG. 8d, with the actuator striker 28 proceeding through the channel exit 70 to a free position outside of the cam 56. This allows for free movement of the vehicle door 11 relative to the striker pin 28.

Figure 9:
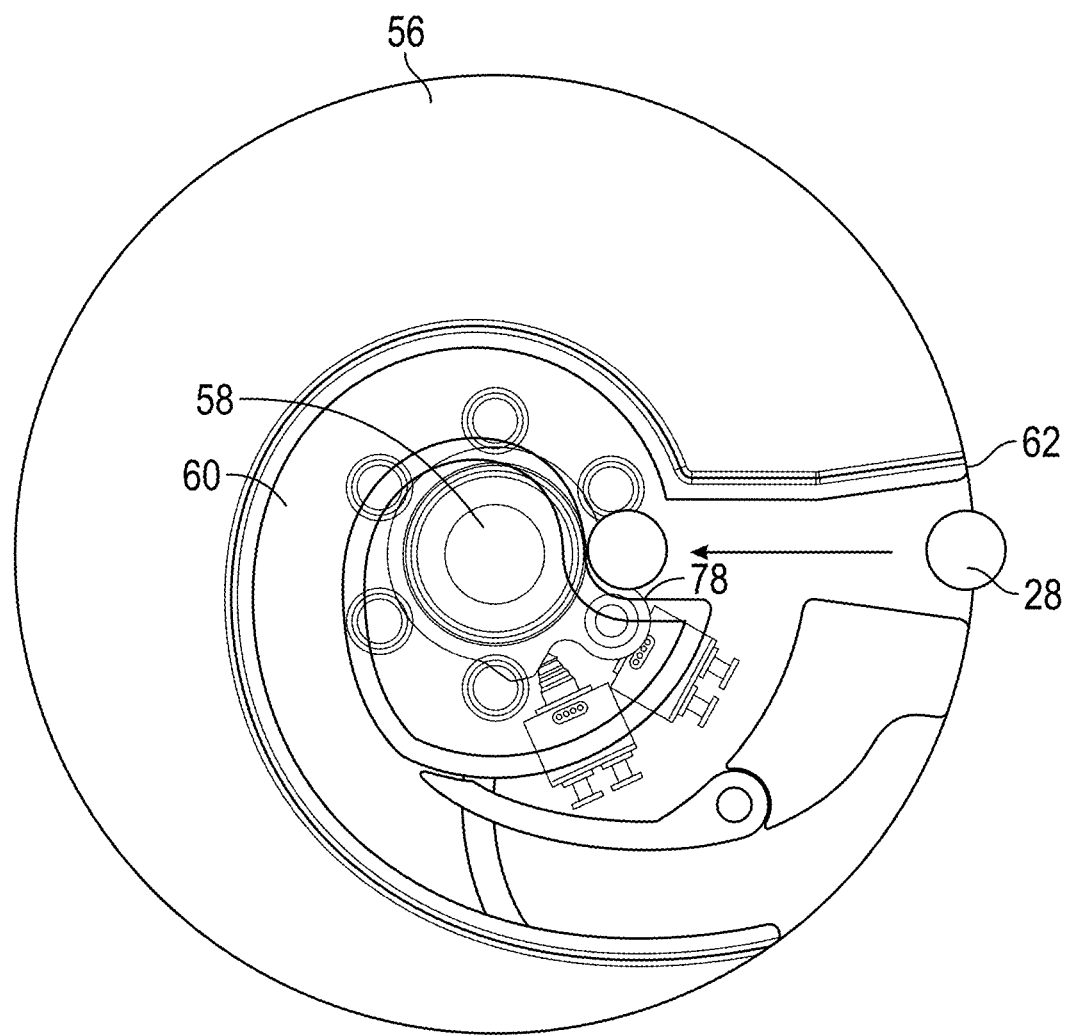
FIG. 9 illustrates a door closing operation of an embodiment of a door presenter.

Referring now to FIG. 9, when the cam 56 reaches the door release position, the channel entrance 62 is aligned with the actuator striker 28. This allows for, the actuator striker 28 to go straight through the channel entrance 62 and reach the reset position 78 if the door closure is performed with sufficient velocity by the user.

Figure 10A:
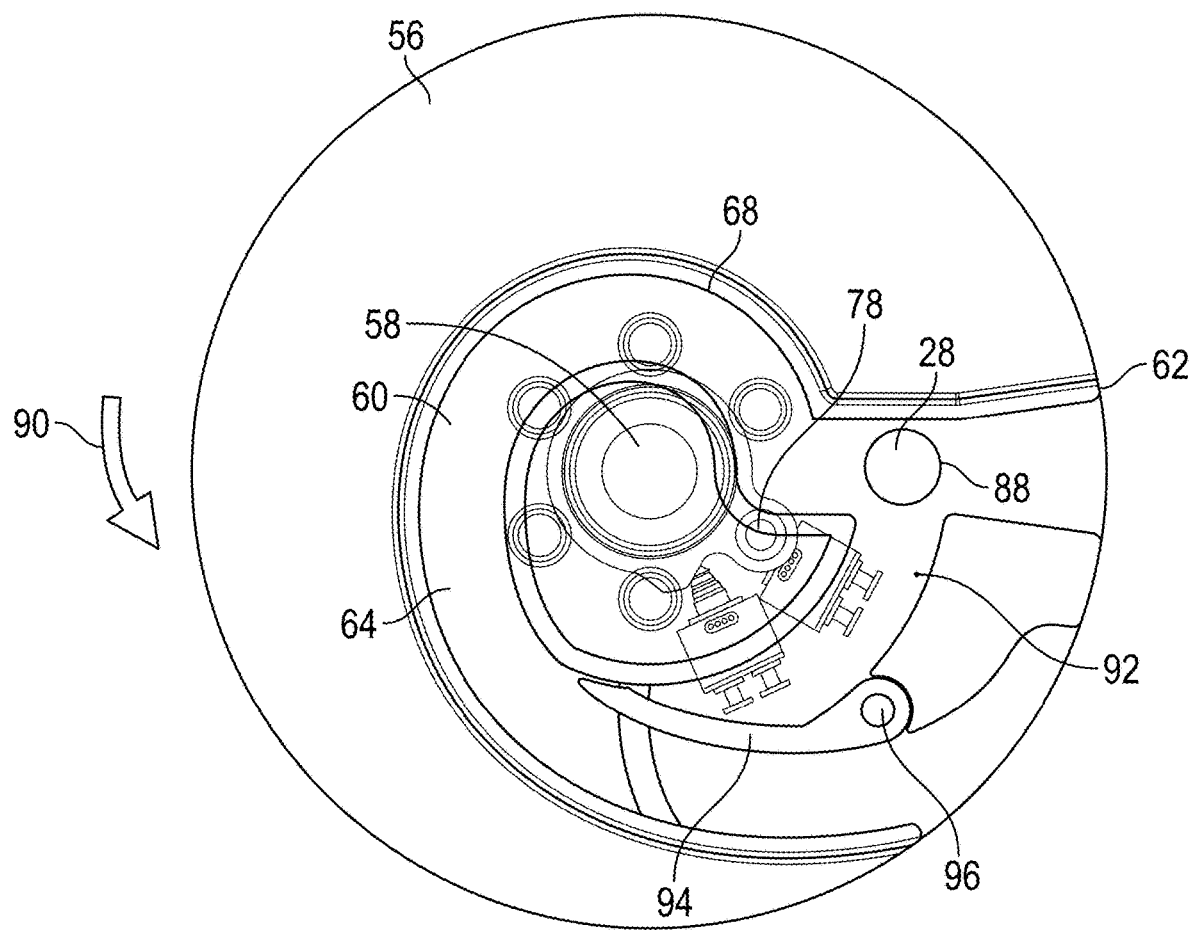
FIGS. 10a-10e illustrate another door closing operation of an embodiment of a door presenter.
Figure 10B:
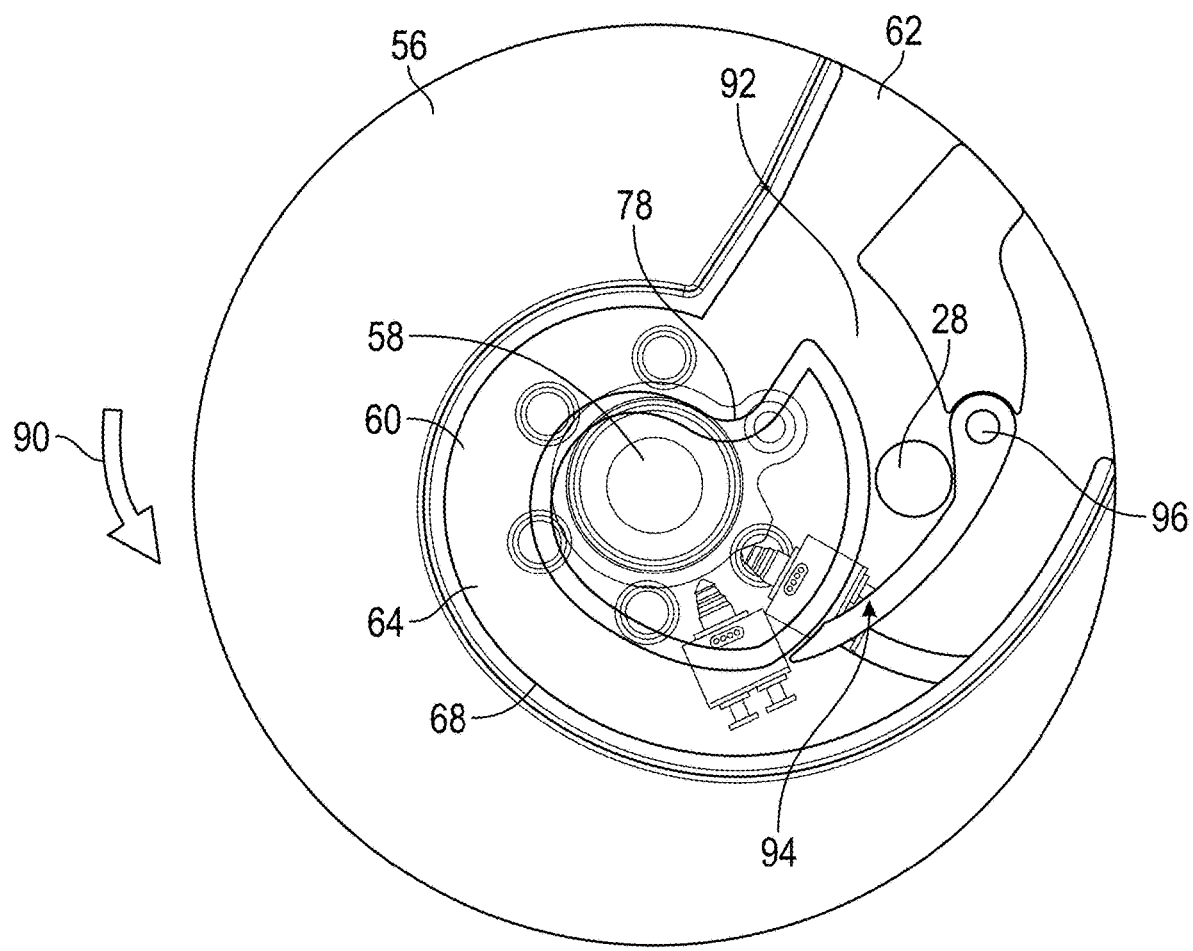
Figure 10C:
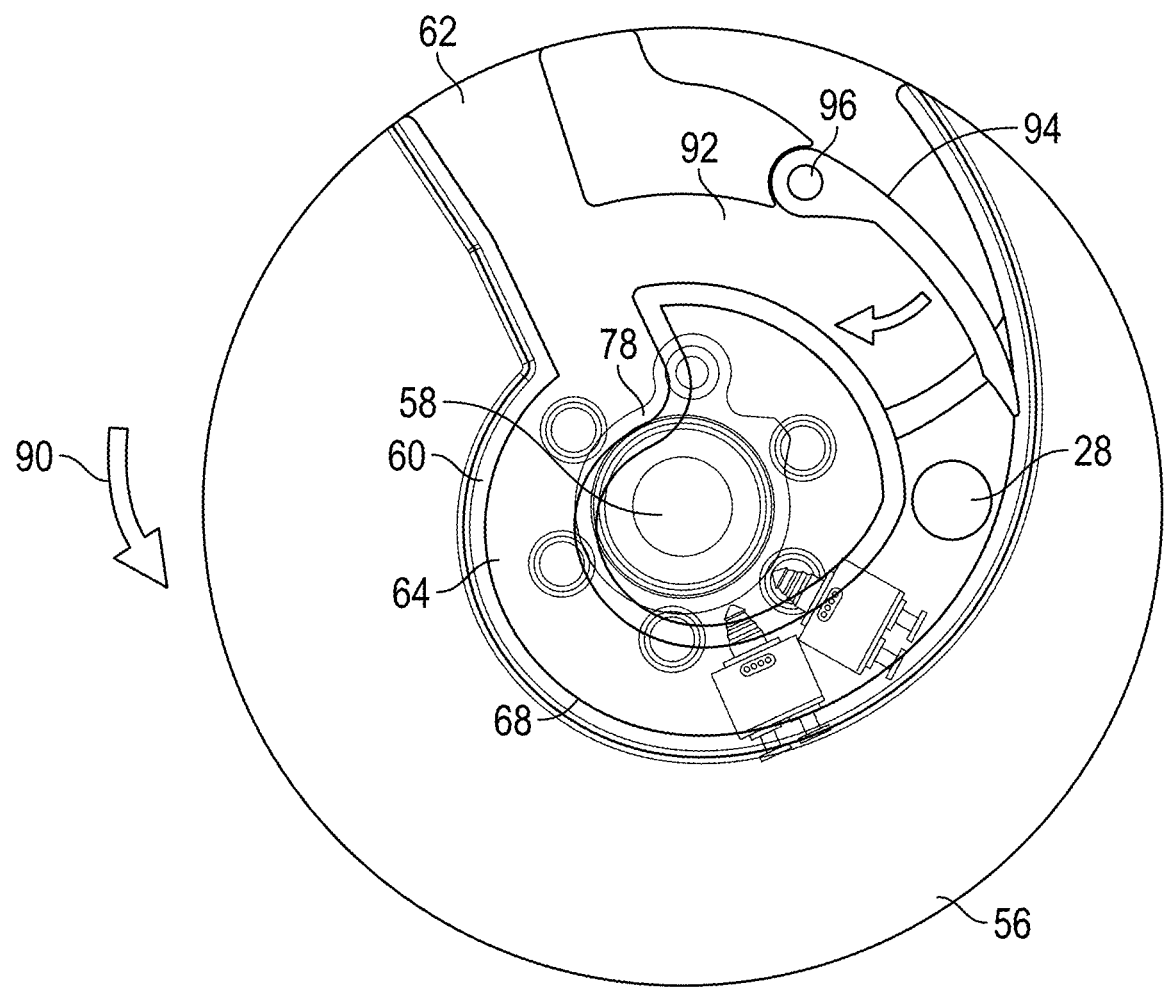
Figure 10D:
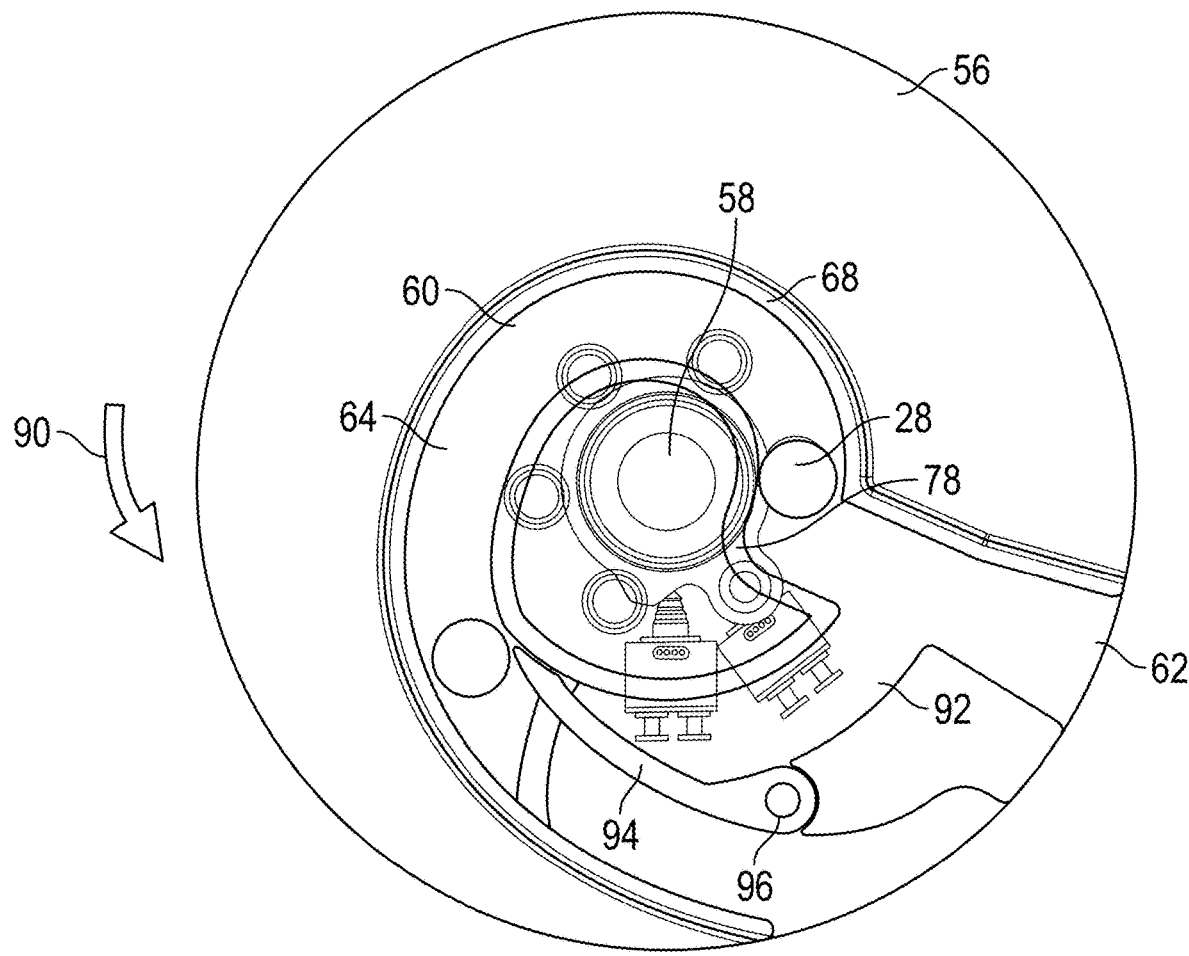
Figure 10E:
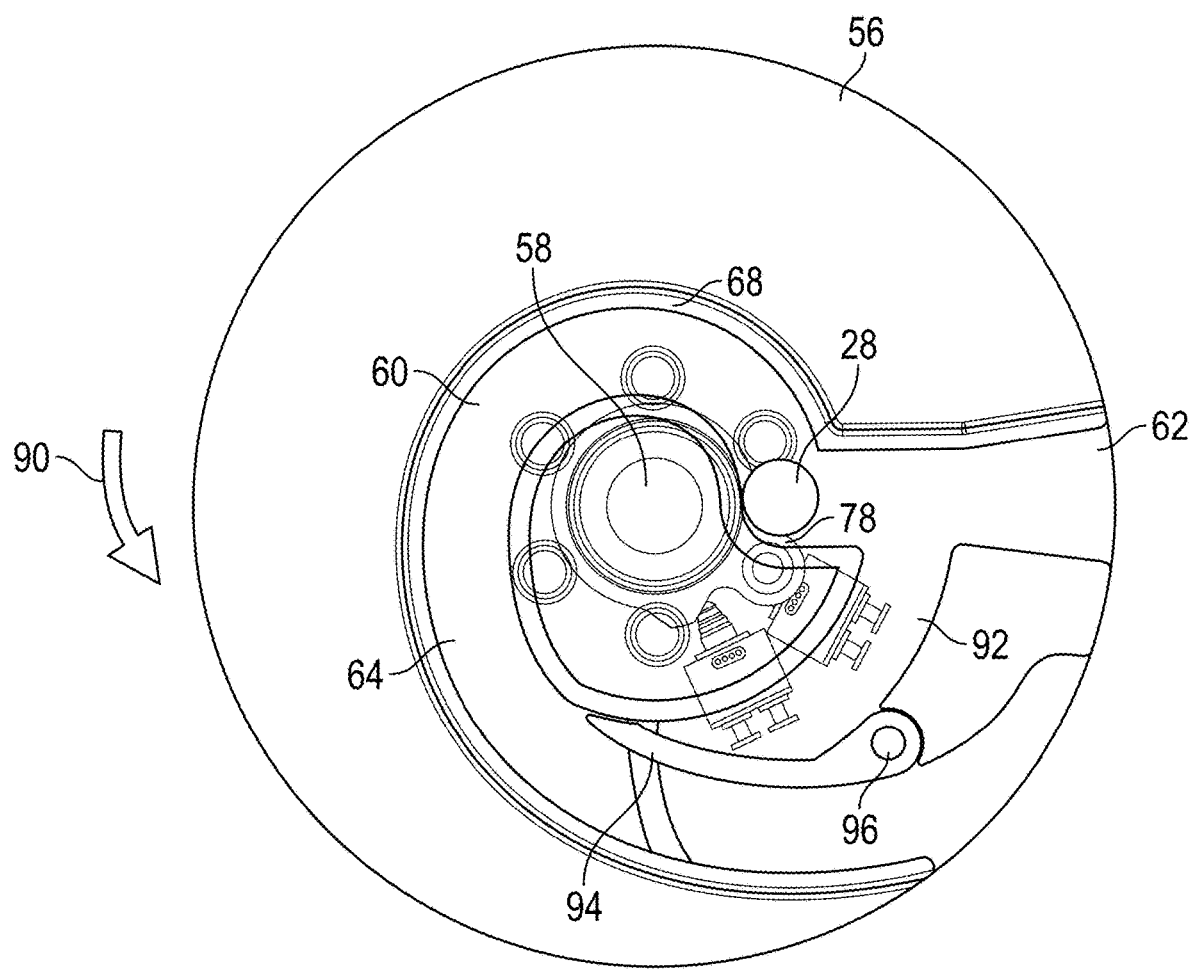

If, however, vehicle door 11 closure is not performed with sufficient velocity, however, a powered closure is employed by the actuator 26. The powered closure will be described with reference to FIGS. 10a-10e. Referring to FIG. 10a, when the vehicle door 11 is not closed with sufficient velocity, the actuator striker 28 reaches a secondary position 88 along the cam channel 60 between the channel entrance 62 and the reset position 78, and the vehicle door 11 is in the partially opened position. The power closure begins with the cam 56 rotating about the cam axis 58 in a counterclockwise direction 90. By the rotation of the cam 56, as shown in FIG. 10b, the actuator striker 28 moves into a secondary cam channel 92 toward a guide blade 94, which divides the secondary cam channel 92 from the curvilinear portion 64. The guide blade 94 is pivotably fixed to the cam 56, such that when the actuator striker 28 is urged against the guide blade 94, the guide blade 94 pivots about a guide pivot 96, and allows the actuator striker 28 to move from the secondary cam channel 92 into the curvilinear portion 64, as shown in FIG. 10c. With continued rotation of the cam 56 about the cam axis 58, as shown in FIG. 10d, the actuator striker 28 proceeds along the channel outer wall 68 of the curvilinear portion 64, pulling the vehicle door 11 from the partially opened position toward the fully closed position. In FIG. 10e, the cam 56 reaches the reset position, with the actuator striker 28 in the reset position 78 and thus the vehicle door 11 in the fully closed position.

The door presenter 14 disclosed herein provides operation in which the vehicle door 11 is retained in the partially opened position, to prevent unintentional and/or uncontrolled moving of the vehicle door 11 to the fully open position by, for example, a gust of wind or due to parking the vehicle on a slope or uneven surface.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A vehicle door presenting system comprising:
   an actuator striker disposed at one of a vehicle body surface or a vehicle door; and
   an actuator disposed at an other of the vehicle body surface or the vehicle door and engagable with the actuator striker, and configured to move the vehicle door between a fully closed position and a partially open position via interaction between the actuator and the actuator striker, the actuator including a retaining portion to maintain engagement with the actuator striker, the retaining portion retaining the vehicle door in the partially open position to prevent the vehicle door from moving toward a fully open position;
   wherein the actuator includes:
      an actuator drive; and
      a cam operably connected to the actuator drive, the cam having a cam channel receptive of the actuator striker at a cam channel entrance.

2. The vehicle door presenting system of claim 1, wherein the cam channel includes a curvilinear portion having an inner channel wall and an outer channel wall defining a width of the cam channel, configured to urge the vehicle door from a fully closed position to the partially open position with rotation of the cam about a cam axis in a first direction.

3. The vehicle door presenting system of claim 2, wherein interaction of the actuator striker with the inner channel wall urges the vehicle door from the fully closed position to the partially open position with rotation of the cam about the cam axis.

4. The vehicle door presenting system of claim 2, wherein the curvilinear portion is configured to urge the vehicle door from the partially open position to the fully closed position with rotation of the cam about the cam axis in a second direction.

5. The vehicle door presenting system of claim 4, wherein interaction of the outer channel wall with the actuator striker urges the vehicle door from the latch secondary engaged position toward the fully closed position.

6. The vehicle door presenting system of claim 2, wherein the retaining portion is disposed at an end of the curvilinear portion.

7. The vehicle door presenting system of claim 1, further comprising a sensor such that, when activated, the actuator striker is released from the partially open position, allowing for movement of the door from the partially open position toward the fully open position.

8. The vehicle door presenting system of claim 7, wherein the sensor can be utilized as an anti-pinch sensor when actuator is turning in a way to close the vehicle door from the partially open position to the fully closed position.

9. The vehicle door presenting system of claim 1, wherein the actuator is integral with a door latch.

10. The vehicle door presenting system of claim 1, wherein actuator striker is retractable.

11. A vehicle door assembly comprising:
a vehicle door;
an electronic latch assembly operatively coupled to the vehicle door; and
a vehicle door presenting system disposed at the vehicle door, including:
an actuator striker disposed at one of a vehicle body surface or a vehicle door;
an actuator disposed at an other of the vehicle body surface or the vehicle door and engagable with the actuator striker, and configured to move the vehicle door between a fully closed position and a partially open position via interaction between the actuator and the actuator striker, the actuator including a retaining portion to maintain engagement with the actuator striker, the retaining portion retaining the vehicle door in the partially open position to prevent the vehicle door from moving toward a fully open position;
wherein the actuator includes:
an actuator drive; and
a cam operably connected to the actuator drive, the cam having a cam channel receptive of the actuator striker at a cam channel entrance.

12. The vehicle door assembly of claim 11, wherein the cam channel includes a curvilinear portion having an inner channel wall and an outer channel wall defining a width of the cam channel, configured to urge the vehicle door from a fully closed position to the partially open position with rotation of the cam about a cam axis in a first direction.

13. The vehicle door assembly of claim 12, wherein interaction of the actuator striker with the inner channel wall urges the vehicle door from the fully closed position to the partially open position with rotation of the cam about the cam axis.

14. The vehicle door assembly of claim 12, wherein the curvilinear portion is configured to urge the vehicle door from the partially open position to the fully closed position with rotation of the cam about the cam axis in a second direction.

15. The vehicle door assembly of claim 14, wherein interaction of the outer channel wall with the actuator striker urges the vehicle door from the partially open position toward the fully closed position.

16. The vehicle door assembly of claim 12, wherein the retaining portion is disposed at an end of the curvilinear portion.

17. The vehicle door assembly of claim 11, further comprising a secondary sensor such that, when activated, the actuator striker is released from the partially open position, allowing for movement of the vehicle door from the partially open position toward the fully open position.

18. The vehicle door assembly of claim 11, wherein the actuator is integral with the electronic latch assembly.

* * * * *